United States Patent [19]

Tsukamoto et al.

[11] Patent Number: 4,501,717
[45] Date of Patent: Feb. 26, 1985

[54] SINTERING METHOD USING A PLASMA GAS ATMOSPHERE

[75] Inventors: Shinya Tsukamoto; Kunihiro Takahashi; Akira Doi, all of Itami, Japan

[73] Assignee: Sumitomo Electric Industries, Ltd., Osaka, Japan

[21] Appl. No.: 515,894

[22] Filed: Jul. 21, 1983

[30] Foreign Application Priority Data

Jul. 31, 1982 [JP] Japan ............... 57-134332

[51] Int. Cl.³ .................................. C22B 34/00
[52] U.S. Cl. ........................ 419/58; 419/56; 419/57
[58] Field of Search ................... 419/56, 57, 58

[56] References Cited

U.S. PATENT DOCUMENTS

| 4,011,076 | 3/1977 | Hovis et al. | 419/57 |
| 4,347,084 | 8/1982 | Hähn et al. | 419/57 |

FOREIGN PATENT DOCUMENTS

| 692461 | 6/1940 | Fed. Rep. of Germany | 419/58 |
| 50407 | 4/1979 | Japan | 419/56 |
| 122611 | 9/1979 | Japan | 419/57 |
| 420394 | 3/1974 | U.S.S.R. | 419/56 |

Primary Examiner—Leland A. Sebastian
Attorney, Agent, or Firm—Wenderoth, Lind & Ponack

[57] ABSTRACT

This invention provides a process for producing a high quality powdered alloy such as cemented carbides, cermets, ceramics and iron-containing sintered alloys by sintering, characterized in that the sintering is carried out in a plasma gas atmosphere of $H_2$, $N_2$, CO, He and/or Ar.

14 Claims, 5 Drawing Figures

SINTERING METHOD USING A PLASMA GAS ATMOSPHERE

BACKGROUND OF THE INVENTION

1. Field of the Invention

This invention relates to a method of preparing powdered alloys such as cemented carbides, cermets, ceramics and ferrous alloys by sintering and more particularly, it is concerned with a novel method of sintering powdered alloys, whereby it is made possible to produce high quality alloys that cannot be obtained by the prior art vacuum sintering method or gas atmosphere sintering method.

2. Description of the Prior Art

Up to the present time, TiC-containing WC base cemented carbides and TiC base cermets have been subjected to reduction by sintering in vacuum, $H_2$ atmosphere under reduced pressure or CO atmosphere under reduced pressure. According to this method, however, the reduction cannot completely be carried out and a large quantity of oxygen remains in the alloy, thus degrading the sintering property. N-containing TiC base cermets and N-containing WC base cemented carbides have generally been sintered in $N_2$ atmosphere under reduced pressure, but in this case, a number of cavities are formed in the alloy even if denitrification is prevented and accordingly, a compact alloy cannot be obtained.

SUMMARY OF THE INVENTION

It is an object of the present invention to provide a sintering method whereby the above described disadvantages of the prior art can be overcome.

It is another object of the present invention to provide a method of preparing sintered alloys typical of which are cemented carbides, cermets, ceramics and iron-containing alloys.

These objects can be attained by a method of sintering a shaped body for a powdered alloy such as cemented carbides, cermets, ceramics and ferrous alloys, characterized in that a part or all of the sintering process is carried out in a plasma gas atmosphere.

BRIEF DESCRIPTION OF THE DRAWINGS

The accompanying drawings are to illustrate the principle and merits of the invention in greater detail.

DETAILED DESCRIPTION OF THE INVENTION

Figure 1:
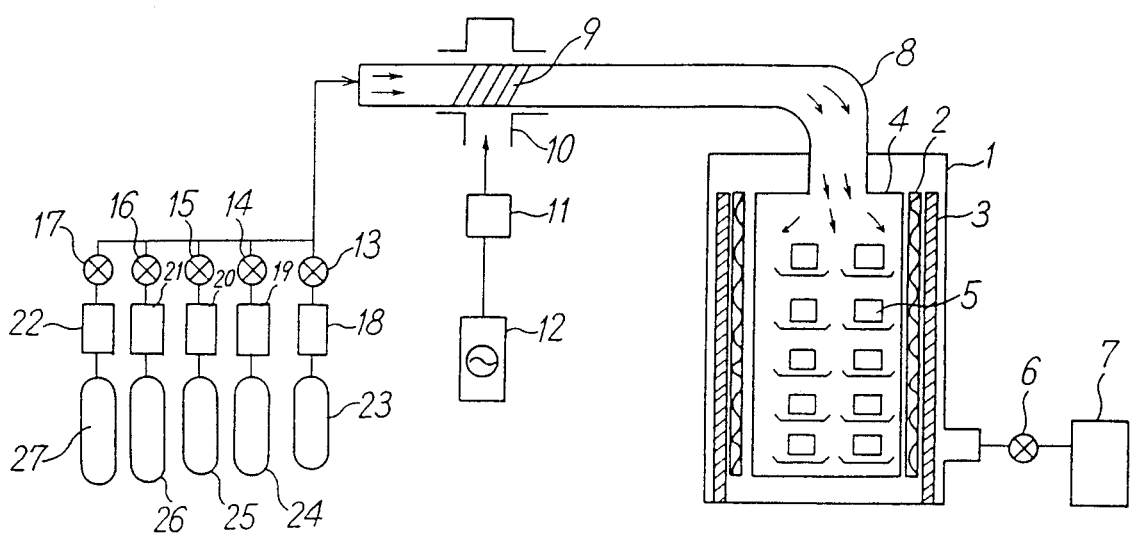
FIG. 1 is a schematic view of one embodiment of a sintering system according to the present invention.

The inventors have made efforts to overcome the disadvantages of the prior art and consequently, have found that powdered alloys such as cemented carbides, cermets, ceramics and ferrous sintered bodies can effectively be produced by sintering while generating a gas plasma atmosphere using a high frequency power source and/or microwave power source and an atmosphere consisting of one or more of $H_2$, $N_2$, CO, He and Ar during sintering process.

Generally, plasma is classified into a heat plasma under equilibrium state, in which electrons and ions have substantially the same energy, and a low temperature plasma under nonequilibrium state, in which electrons have a larger energy than ions and gas molecules.

The present invention is a sintering method utilizing the latter low temperature plasma. In the case of the low temperature plasma, the temperature of ions and gas molecules is excited from several hundreds to one thousand degrees and the temperature of the electrons reaches several ten thousands degrees. This high energy electron is subject to inelastic collision with the gas molecule to dissociate it into a reactive atom called a "radical", thus promoting the gaseous reaction.

When a reducing gas such as $H_2$ or CO is converted into a plasma, for example, it is sometimes possible to reduce materials which are considered to be hardly reducible thermodynamically based on chemical equilibrium. CO plasma is effective for not only reducing action as described above, but also for precise control of the carbon content in a sintered body.

In the plasma sintering using $H_2$ (which will hereinafter be referred to as "$H_2$ plasma sintering"), there are obtained the following advantages and effects over the prior art sintering method in a vacuum or in a gas atmosphere:

The first object of the $H_2$ plasma sintering is to reduce a sintered alloy. The $H_2$ plasma sintering is more resource-saving and more economical than the reduced pressure $H_2$ atmosphere sintering according to the prior art, since a lower concentration (less gas flow) can be employed. The reduced pressure $H_2$ Atmosphere sintering of the prior art is ordinarily carried out in an $H_2$ atmosphere of several tens to several hundreds Torr so as to raise the reducing action, but in this method, not only complete removal of oxygen in the alloy is impossible, but also sufficient degassing of the unnecessary gases such as $H_2O$ contained in the alloy is impossible due to its pressure, thus hindering the sintering. In the case of $H_2$ plasma sintering, on the other hand, reduction can completely be carried out in an $H_2$ atmosphere plasma of several Torr and degassing of the unnecessary gases can sufficiently be carried out due to the high vacuum. According to the $H_2$ plasma sintering, therefore, there can be obtained an alloy with an extremely low oxygen content and few voids.

The effect of $N_2$ plasma sintering will be illustrated. In the case of sintering $N_2$-containing alloys, denitrification of the alloy is remarkable according to the prior art vacuum sintering to form separated layers of WC and Co on the surface layer and there arises a problem that the surface hardness is lowered. In the case of the $N_2$ atmosphere sintering, it is necessary to introduce a high concentration $N_2$ gas in order to prevent the denitrification and degassing of the interior of the alloy is not sufficiently effected, resulting in a cause of voids. If contrast to these sintering methods, the $N_2$ plasma sintering method has the feature that in spite of a small quantity of $N_2$ flow, an effective prevention of denitrification and effective $N_2$ control are possible by radical $N_2$ activated by the plasma and furthermore, unnecessary gases generated in the interior of the alloy can readily be removed due to the high vacuum, thus preventing formation of voids.

The effect of CO plasma sintering will be illustrated. The CO plasma sintering is characterized by a reducing action and carbon control of alloys. Similarly to the case of the above described $H_2$ or $N_2$ plasma sintering, this CO plasma sintering method is effective with a lower concentration and capable of effecting degassing more sufficiently as compared with the prior art CO atmosphere sintering. In each plasma sintering of $H_2$, $N_2$, CO, He and Ar, the surface of a sintered body is subject to plasma etching with the activated gas and consequently, the surface of the alloy is cleaned to upgrade the properties.

When sintering is carried out in an atmosphere in which plasma is generated under a mixed state of $H_2$, $N_2$, CO, He and Ar, the combined effects of the prevention of denitrification, reduction and carbon control are given to sintered bodies. This is the feature which cannot be obtained by the prior art vacuum sintering or atmosphere sintering.

Generally, in the present invention, sintering is carried out at a temperature of 1000° to 1500° C. under a plasma gas pressure of 0.1 to 50 Torr.

An apparatus and sintering furnace, used in the plasma sintering method of the present invention, will now be illustrated with reference to the accompanying drawings:

FIG. 1 shows one embodiment of an apparatus and sintering furnace, used in the sintering of the present invention. In a stainless furnace body 1, there are arranged a graphite heater 2, an insulator 3 such as carbon wool and a graphite reaction pipe 4 in which workpieces 5 are charged, and the furnace body is evacuated and held in vacuum by rotary pump 7 via valve 6. Reaction pipe 4 is connected with a quartz conduit 8. On the other hand, $H_2$, $N_2$, CO, Ar and He gases are introduced into the other end of conduit 8 from bombs 23-27 via flow meters 18-22 and valves 13-17 and converted into plasma gas 9 by a microwave from microwave generator 12 and tuner 11 via waveguide 10.

Figure 2:
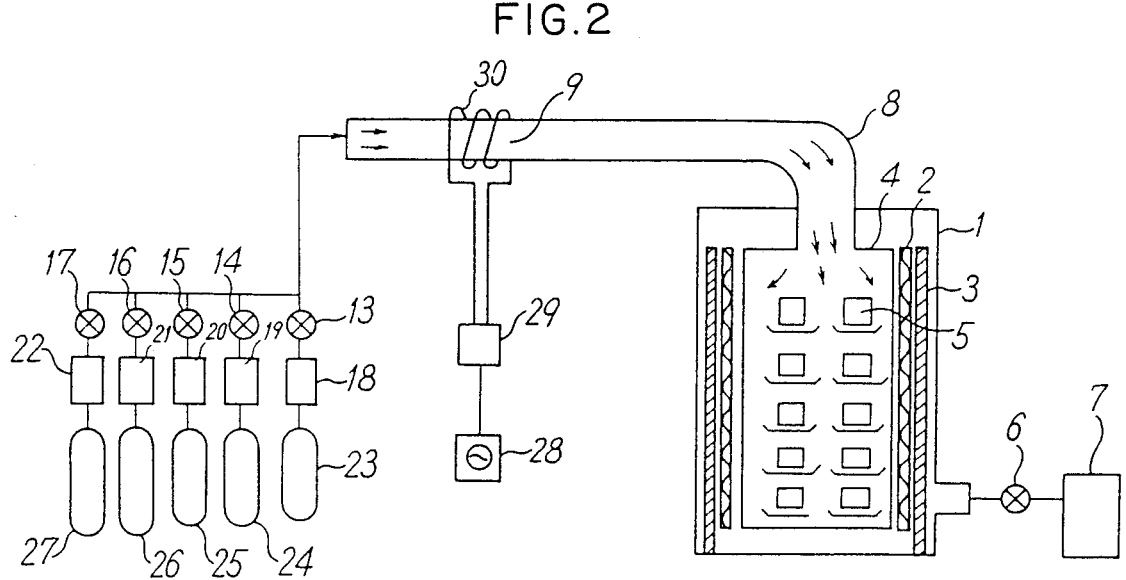
FIG. 2 and FIG. 3 are schematic views of other embodiments of sintering systems according to the present invention.
Figure 3:
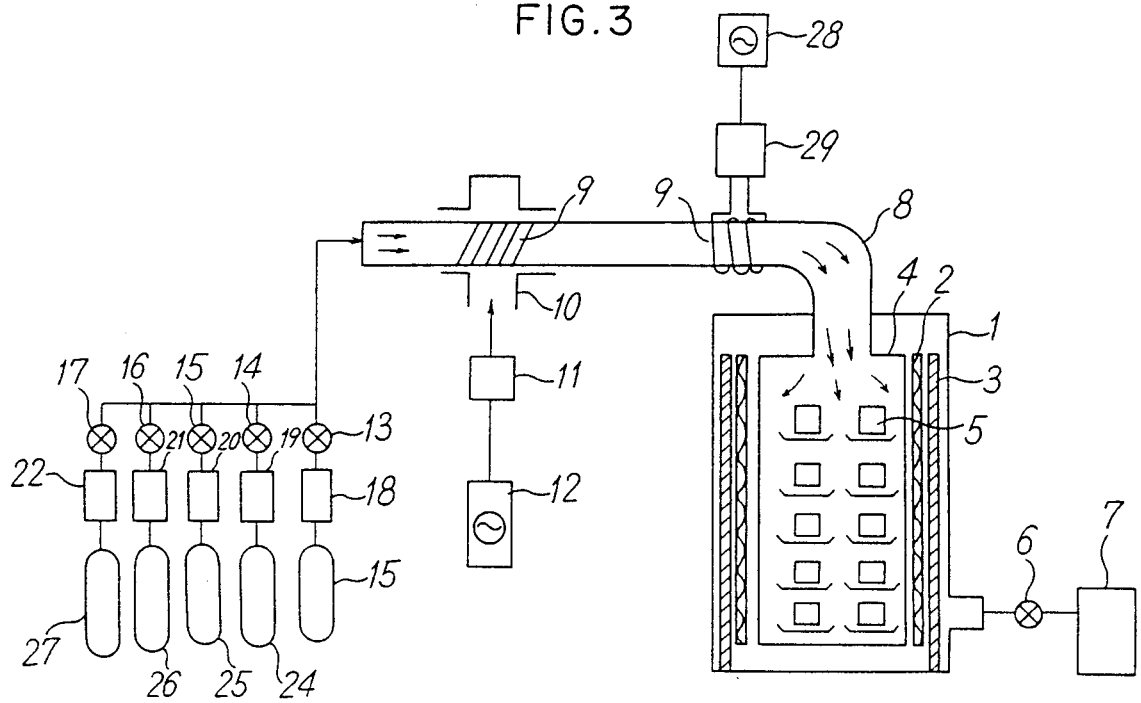

FIG. 2 and FIG. 3 show other embodiments of apparatus and sintering furnaces used for the sintering according to the present invention. In FIG. 2, plasma gas 9 is produced by the use of high frequency generator 28, matching device 29 and copper coil 30, and in FIG. 3, a gas with a higher plasma density is produced by the use of microwave generator 12 and high frequency generator 28, in combination.

The following examples are given in order to illustrate the present invention in greater detail without limiting the same.

EXAMPLE 1

This example shows a powder sintered body of cermet type. A commercially available TiC powder with a mean grain size of 1 μm was mixed with a TiN powder, WC powder and $Mo_2C$ powder with substantially the same grain size, and a Co powder and Ni powder with a grain size of 100 mesh or less according to the recipe of Table 1, mixed with acetone in a stainless steel-lined pot and then subjected to ball milling treatment by a wet process for 96 hours. To this mixed powder was added 3% by weight of camphor and pressed under a pressure of 2 t/cm².

Thereafter, the resulting sample was heated from room temperature to 1200° C. in the system of FIG. 1 while generating $H_2$ plasma of 0.5 Torr with a frequency of 2450 MHz and microwave generating power of 1 KW and then sintered at 1400° C. for 1 hour under a vacuum degree of $10^{-2}$ Torr. The alloy obtained by the $H_2$ plasma sintering method according to the present invention had an oxygen content of 0.05 % and less voids in the structure. Assessment of the void was carried out by observing the cut and polished surface of the sintered alloy using an optical microscope of 200 magnification.

On the other hand, the reduced pressure $H_2$ atmosphere sintering according to the prior art was carried out by heating the sample in an $H_2$ atmosphere of 50 Torr up to 1200° C. and then sintering at 1400° C. for 1 hour in a vacuum of $10^{-2}$ Torr. The alloy sintered in $H_2$ atmosphere under reduced pressure according to the prior art had an oxygen content of 0.6% and showed more voids and more dispersion of free carbon as compared with the case of the $H_2$ plasma sintering.

TABLE 1

| (% by weight) | | | | | |
|---|---|---|---|---|---|
| TiC | TiN | WC | $Mo_2C$ | Ni | Co |
| 48 | 12 | 15 | 10 | 10 | 5 |

EXAMPLE 2

Raw materials were mixed according to the same recipe as shown in Table 1 of Example 1 and processed in an analogous manner to Example 1. Then, the sample was heated from room temperature to 1000° C. in a vacuum of $10^{-2}$ Torr using the system of FIG. 2, further heated up to 1400° C. while generating N, plasma of 0.3 Torr with a frequency of 13.56 MHz and a high frequency generating power of 500 W and held for 1 hour under the same plasma conditions.

On the other hand, a comparative experiment was carried out by the prior art $N_2$ atmosphere sintering. The temperature raising step was completely the same, but the sintering was carried out in an $N_2$ atmosphere of 50 Torr by heating from 1000° C. to 1400° C. and holding at 1400° C.

Table 2 shows the contents of $N_2$ and $O_2$ contained in the sintered alloys and the assessment of voids. The assessment of the voids is according to the standard of judging the degree of voids in cemented carbides, described in "Cemented Carbides and Tools" page 55 by Funmatsu Yakin Gijutsu Kyokai.

TABLE 2

| | $N_2$ content | $O_2$ content | Assessment of voids |
|---|---|---|---|
| $N_2$ Plasma Sintering | 2.61 wt % | 0.5 wt % | $A_1$ type |
| $N_2$ Atmosphere Sintering | 2.60 wt % | 0.6 wt % | $A_2$, $A_3$, $B_1$ type |

As shown in Table 2, there is little difference in the $N_2$ content between the both. This means that in spite of the $N_2$ atmosphere with a lower concentration, the reducing action markedly proceeds by radicals activated by plasma. On the other hand, there is a clear difference in the assessment of the voids. In the case of the $N_2$ plasma sintering, formation of voids is the least (A type) in such a state that pores of 10 μm or less are dispersed, while in the case of the $N_2$ atmosphere sintering, pores of 10 μm or more are found to an extent of $B_1$ type. The cause of difference in the formation of voids is due to that the $N_2$ plasma sintering is carried out under a lower pressure than the $N_2$ atmosphere sintering as described above, so degassing proceeds sufficiently and uniformly.

Figure 4:
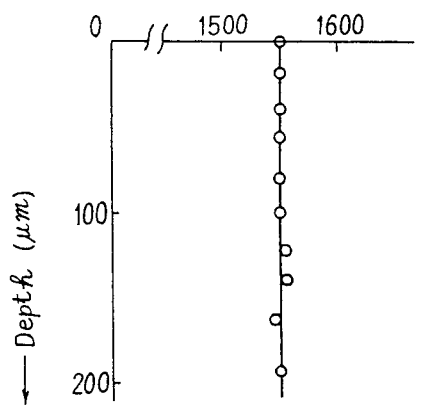
FIG. 4 is a graph showing the hardness distribution in depth direction in $N_2$ plasma sintering according to the present invention.

The surface hardness of the sintered alloy in the $N_2$ plasma sintering is substantially similar to that of the interior thereof, as shown in FIG. 4.

EXAMPLE 3

Raw materials were mixed according to the same recipe as shown in Table 1 of Example 1 and processed in an analogous manner to Example 1. Using the system of FIG. 3, the sample was heated from room temperature to 1200° C. while generating $H_2$ plasma of 3 Torr with a frequency of 2450 MHz and microwave generating power of 1 KV, then heated up to 1400° C. while generating $N_2$ plasma of 0.3 Torr with a frequency of 13.56 MHz and high frequency generating power of 500 W and further held for 1 hour under the same $N_2$ plasma conditions.

On the other hand, a comparative experiment was carried out by raising the temperature from room temperature to 1200° C. in $H_2$ atmosphere of 50 Torr, then raising the temperature up to 1400° C. in an $N_2$ atmosphere of 50 Torr and further holding the sample for 1 hour in the same $N_2$ atmosphere.

Table 3 shows comparison of the alloy properties of these two samples:

TABLE 3

| | $N_2$ content | $O_2$ content | Hv |
|---|---|---|---|
| $H_2$, $N_2$ Plasma Sintering | 2.60 wt % | 0.04 wt % | 1625 |
| $H_2$, $N_2$ Atmosphere Sintering | 2.40 wt % | 0.6 wt % | 1508 |

In the $H_2$, $N_2$ plasma sintering method according to the present invention, there are obtained a normal $N_2$ content, much lower $O_2$ content and larger surface hardness in comparison with the $H_2$, $N_2$ atmosphere sintering method according to the prior art.

The effect of the $H_2$, $N_2$ plasma sintering, obtained in Example 3, appears in the form of the sum of the $H_2$ plasma effect of Example 1 and the $N_2$ plasma effect of Example 2. That is, it is proved that the reducing action and nitriding action are effectively carried out in $H_2$ plasma atmosphere and $H_2$ plasma atmosphere respectively. In addition, degassing is sufficiently effected because both $H_2$ and $N_2$ are under a lower Torr. Thus, the alloy properties are considered to be remarkably improved by the degassing action in addition to the above described reducing action and prevention of denitrification.

EXAMPLE 4

Raw materials were mixed according to the same recipe as shown in Table 1 of Example 1 and processed in an analogous manner to Example 1. Using the apparatus of FIG. 3, the resulting sample was heated from room temperature to 1200° C. while generating plasma of a mixed gas of $H_2$ and CO (2:1) in a vacuum of 0.6 Torr by applying simultaneously a microwave generating power of 1 KW with a frequency of 2450 MHz and a high frequency generating power of 500 W with a frequency of 13.6 MHz, then heated up to 1400° C. while generating a plasma of a mixed gas of $H_2$, C0 and $N_2$ ($H_2$:CO:$N_2$=2:1:1) in a vacuum degree of 0.8 Torr under the same microwave and high frequency generating conditions and further held for 1 hour under the same conditions.

On the other hand, a comparative experiment was carried out using the same gas flow, mixing composition and vacuum degree as those of the above described plasma sintering except not generating the plasma.

The alloy properties of both the samples obtained are shown in Table 4 (%: by weight):

TABLE 4

| | $N_2$ content | $O_2$ content | C content/ standard deviation | Hv |
|---|---|---|---|---|
| $H_2$, $N_2$, CO Plasma Sintering | 2.60% | 0.03% | 8.70%/0.02 | 1632 |
| $H_2$, $N_2$, CO Atmosphere Sintering | 2.40% | 0.4% | 8.65%/0.12 | 1511 |

The feature of the plasma sintering method in this example is that gases are fed in mixed state and the carbon content is controlled by the CO gas. As shown in Table 4, the standard deviation of carbon content is small, i.e. 0.02 in the plasma sintering of the mixed gases according to the present invention. That is, in this sintering method, there is little dispersion among the samples.

The contents of $N_2$ and $O_2$, and the value of Hv are similar to set forth above.

EXAMPLE 5

This example shows a powder sintered alloy of cemented carbide type by plasma sintering.

TABLE 5

| (% by weight) | | | | |
|---|---|---|---|---|
| WC | TiC | TiN | TaC | Co |
| 60 | 12 | 5 | 13 | 10 |

A WC powder with a mean grain size of 2 μm was mixed with a TiC powder, TiN powder and TaC powder with a mean grain size of 1 μm, and a Co powder with a grain size of 100 mesh or less according to the recipe of Table 5, mixed with acetone for 5 hours in an attriter, to which 3% by weight of camphor was then added, and the resulting mixture was pressed under a pressure of 2 t/cm². Thereafter, the resulting sample was heated from room temperature to 1000° C. in a vacuum of $10^{-2}$ Torr in the system of FIG. 1, then heated up to 1400° C. while generating an $N_2$ plasma of 0.2 Torr by a microwave generating power of 2 KV and further held for 1 hour.

On the other hand, comparative tests were carried out by vacuum sintering or by $N_2$ atmosphere sintering. The $N_2$ atmosphere sintering was carried out by heating the sample from 1000° C. to 1400° C. in a vacuum degree of 100 Torr and holding for 1 hour under the same conditions.

Table 6 shows the alloy properties of these three samples (%: by weight):

TABLE 6

| | $N_2$ content | $O_2$ content | C content/ standard deviation | Assessment of voids |
|---|---|---|---|---|
| $N_2$ Plasma Sintering | 0.63% | 0.30% | 6.5%/0.06 | $A_1$ |
| $N_2$ Atmosphere Sintering | 0.62% | 0.25% | 6.4%/0.10 | $A_3$ |
| Vacuum Sintering | 0.60% | 0.31% | 6.3%/0.15 | $B_2$ |

Figure 5:
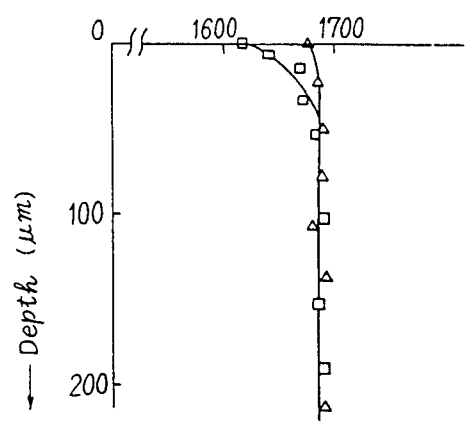
FIG. 5 is a graph showing the hardness distribution in depth direction in $N_2$ plasma sintering according to the present invention, $N_2$ atmosphere sintering and vacuum sintering.

As shown in FIG. 5, there is a clear difference in the value of Hv in the depth direction, although it does not seem that there is a considerable difference in $N_2$ content among the three, since the $N_2$ content is calculated based on the whole of the alloy. In the case of the vacuum sintering, an extreme denitrification proceeded from the surface to form separated layers of WC and Co with a low hardness and there were found also voids. In the case of the $N_2$ atmosphere sintering, there is little denitrification and the surface hardness is substantially similar to the hardness of the inside as evident from Table 6 and FIG. 5, but formation of voids is remarkable.

In the case of the $N_2$ plasma sintering too, the surface hardness is substantially similar to that of the inside, as shown in FIG. 5, and there is scarcely found formation of separated layers of WC and Co and voids. In FIG. 5, Δ shows the case of the $N_2$ plasma sintering and the case of the $N_2$ atmosphere sintering and □ shows the case of the vacuum sintering.

EXAMPLE 6

Raw materials were mixed according to the same recipe as shown in Table 5 of Example 5 and processed in an analogous manner to Example 5. Using the system of FIG. 3, the sample was sintered under sintering conditions shown in Table 7 by applying a microwave generating power of 1 KV and a high frequency generating power of 500 W:

TABLE 7

| | Temperature | |
|---|---|---|
| | room temperature 1000° C. | 1000 1400° C. held for 1 hour |
| Degree of Vacuum | 1 Torr | 1.5 Torr |
| Composition of Mixed Gases | $H_2:CO = 2:1$ | $H_2:CO:N_2 = 2:1:1$ |

A comparative test was carried out by subjecting the sample to mixed gas atmosphere sintering under the conditions of Table 7, which was free from plasma.

Table 8 shows the alloy properties of the resulting sintered samples (%: by weight):

TABLE 8

| | $N_2$ content | $O_2$ content | C content/ standard deviation | Hv | Assessment of voids |
|---|---|---|---|---|---|
| Mixed Gas Plasma Sintering | 0.63% | 0.01% | 6.5%/0.02 | 1750 | $A_1$ |
| Mixed Gas Atmosphere Sintering | 0.55% | 0.12% | 6.4%/0.28 | 1680 | $A_3$ |

As in evident from Table 8, the plasma sintering method has more excellent properties as to $N_2$ content, $O_2$ content, dispersion of C content and Hv.

EXAMPLE 7

This example shows a powder sintered alloy of ceramic type by plasma sintering.

An $Al_2O_3$ powder with a grain size of 0.5 μm was mixed with paraffin in a proportion of 10% by weight, ball milled for 100 hours and then pressed under a pressure of 2.5 t/cm². Using the system of FIG. 2, the sample was heated up to 1400° C. while generating Ar plasma of 1 Torr by applying a high frequency plasma power of 300 W and held for 2 hours.

In the prior art, sintering of ceramics is carried out by the vacuum sintering method. In this case, however, such a problem arises that the surface of a sintered body is carburized by a carbon heater or carbon wool in a vacuum sintering furnace to darken the surface of the white sintered body.

In the Ar plasma sintering of this example, such a carburization did not take place, because the alumina surface was etched with the activated Ar atoms to remove carburized areas.

EXAMPLE 8

This example shows a powder sintered alloy of ferrous type by plasma sintering.

Powders having a grain size of 100 mesh or less, as shown in Table 9, were mixed for 1 hour by means of a mixer and then subjected to CO plasma sintering and CO atmosphere sintering as a comparative experiment, as shown in Table 10:

TABLE 9

| | (wt %) | | | |
|---|---|---|---|---|
| Fe | Mn | Cr | Mo | C |
| balance | 0.6 | 1 | 0.3 | 0.6 |

The plasma sintering was carried out by applying a microwave generating power of 2 KV using the system of FIG. 1.

TABLE 10

| | Temperature Raising | Atmosphere |
|---|---|---|
| CO Plasma Sintering | Room Temp. 1250° C. | CO:10 Torr |
| CO Atmosphere Sintering | " | CO:100 Torr |

In the prior art, it is difficult to prevent decarburization in the vacuum sintering of a C-containing ferrous powder, because C is used for the reduction of iron oxides contained in the powder. Thus, CO atmosphere sintering is carried out. In the CO plasma sintering under a pressure of 10 Torr, as shown in Table 1, there are obtained excellent carbon control and reducing action, at least, comparable to those in the case of the CO atmosphere sintering under a pressure of 100 Torr. In addition, in the case of the plasma sintering, the surface of the sintered alloy is cleaned due to the etching effect.

What is claimed is:

1. In a method which comprises sintering a pressed body of a powder selected from the group consisting of powders to produce cemented carbides, cermets, ceramics and ferrous sintered bodies, the improvement in which a part or all of the sintering process is carried out in a plasma gas atmosphere selected from the group consisting of $H_2$, $N_2$, Co, He, Ar and mixtures thereof under a pressure of 0.1 to 50 Torr.

2. A method according to claim 1 wherein the plasma gas is a low temperature plasma generated by a high frequency power source.

3. A method according to claim 1 wherein the plasma is a low temperature plasma generated by a microwave power source.

4. A method according to claim 1 wherein the sintering is carried out at 1000° to 1500° C.

5. A method according to claim 1 wherein the sintered body is a cemented carbide.

6. A method according to claim 1 wherein the sintered body is a cermet.

7. A method according to claim 1 wherein the sintered body is a ceramic.

8. A method according to claim 1 wherein the sintered body is a ferrous sintered body.

9. A method according to claim 1 in which the plasma gas is $H_2$.

10. A method according to claim 1 in which the plasma gas is $N_2$.

11. A method according to claim 1 in which the plasma gas is CO.

12. A method according to claim 1 in which the plasma gas is a mixture of $H_2$ and CO.

13. A method according to claim 1 in which the plasma gas is a mixture of $H_2$, CO and $N_2$.

14. A method according to claim 1 in which the plasma gas is a mixture of $H_2$, $N_2$, CO, He and Ar.

* * * * *